United States Patent
Casado Gimenez et al.

(10) Patent No.: US 6,224,744 B1
(45) Date of Patent: May 1, 2001

(54) ELECTROLYTIC PURIFICATION OF CONTAMINATED WATERS BY USING OXYGEN DIFFUSION CATHODES

(75) Inventors: Juan Casado Gimenez; Enrique Brillas Coso; Rosa Maria Bastida Bonany, all of Barcelona (ES); Michel Vandermeiren, Brussels (BE)

(73) Assignee: Sociedad Espanola de Carburos Metalicos, S.A. (ES)

( * ) Notice: Subject to any disclaimer, the term of this patent is extended or adjusted under 35 U.S.C. 154(b) by 0 days.

(21) Appl. No.: 09/511,860

(22) Filed: Oct. 14, 1997

Related U.S. Application Data

(63) Continuation-in-part of application No. 08/535,223, filed as application No. PCT/ES95/00020 on Feb. 15, 1995, now abandoned.

(30) Foreign Application Priority Data

Feb. 16, 1994 (ES) .................................................. 9400299

(51) Int. Cl.$^7$ ...................................................... C02F 1/461
(52) U.S. Cl. .................. 205/756; 205/758; 205/759; 204/275.1; 204/277
(58) Field of Search .................................. 205/756, 758, 205/759; 204/275.1, 277

(56) References Cited

U.S. PATENT DOCUMENTS

| | | | |
|---|---|---|---|
| 3,793,173 | 2/1974 | Kawahata et al. | 204/149 |
| 4,300,987 | 11/1981 | Tseung et al. | 204/129 |
| 4,585,710 | 4/1986 | McEvoy | 429/27 |
| 4,885,217 | 12/1989 | Hoge | 429/27 |
| 4,927,509 | 5/1990 | Mathur et al. | 204/83 |

FOREIGN PATENT DOCUMENTS

| | | |
|---|---|---|
| 5119363 | 6/1976 | (CN) . |
| 0231100 | 8/1987 | (EP) . |
| 0248433 | 12/1987 | (EP) . |

(List continued on next page.)

OTHER PUBLICATIONS

Journal of Applied Electrochemistry; An Integrated Electrochemical—Chemical Method for the Extraction of $O_2$ from Air; Tseung, A.C.C., Jasem, S.M. (1981) 209–215 (No month).

(List continued on next page.)

*Primary Examiner*—Arun S. Phasge
(74) *Attorney, Agent, or Firm*—Steinberg & Raskin, P.C.

(57) ABSTRACT

The process comprises the oxidation, in an electrolytic cell provided with at least one anodes of pollutants which contaminate wastewaters, and is characterized in that oxygen is diffused in the electrolytic cell cathode or cathodes subjected to a voltage lower than 100 V in order to reduce said gas to a dissolution oxidizing species selected among hydrogen peroxide or hydroxyl and/or peroxydril ($HO_2^·$) radicals. The equipment for implementing said process comprises an elecrolytic cell continuously supplied and provided with an anode (1) and two oxygen diffusion cathodes (2) and is sealed on either side with a frame (3), said frames and cathodes delimiting the compartments (4) which are supplied with oxygen gas and/or gas mixtures containing oxygen through inlets (6); similarly, the cathode and the anode delimit the compartments (5) through which circulates the contaminated water entering through the inlet (5) and coming out through outlets (8). The electrolytic cell of the invention provides for the treatment of contaminating waters which contain toxic, non biodegradable substances or substances which cannot be oxidized by conventional processes.

19 Claims, 1 Drawing Sheet

FOREIGN PATENT DOCUMENTS

Figure 1:
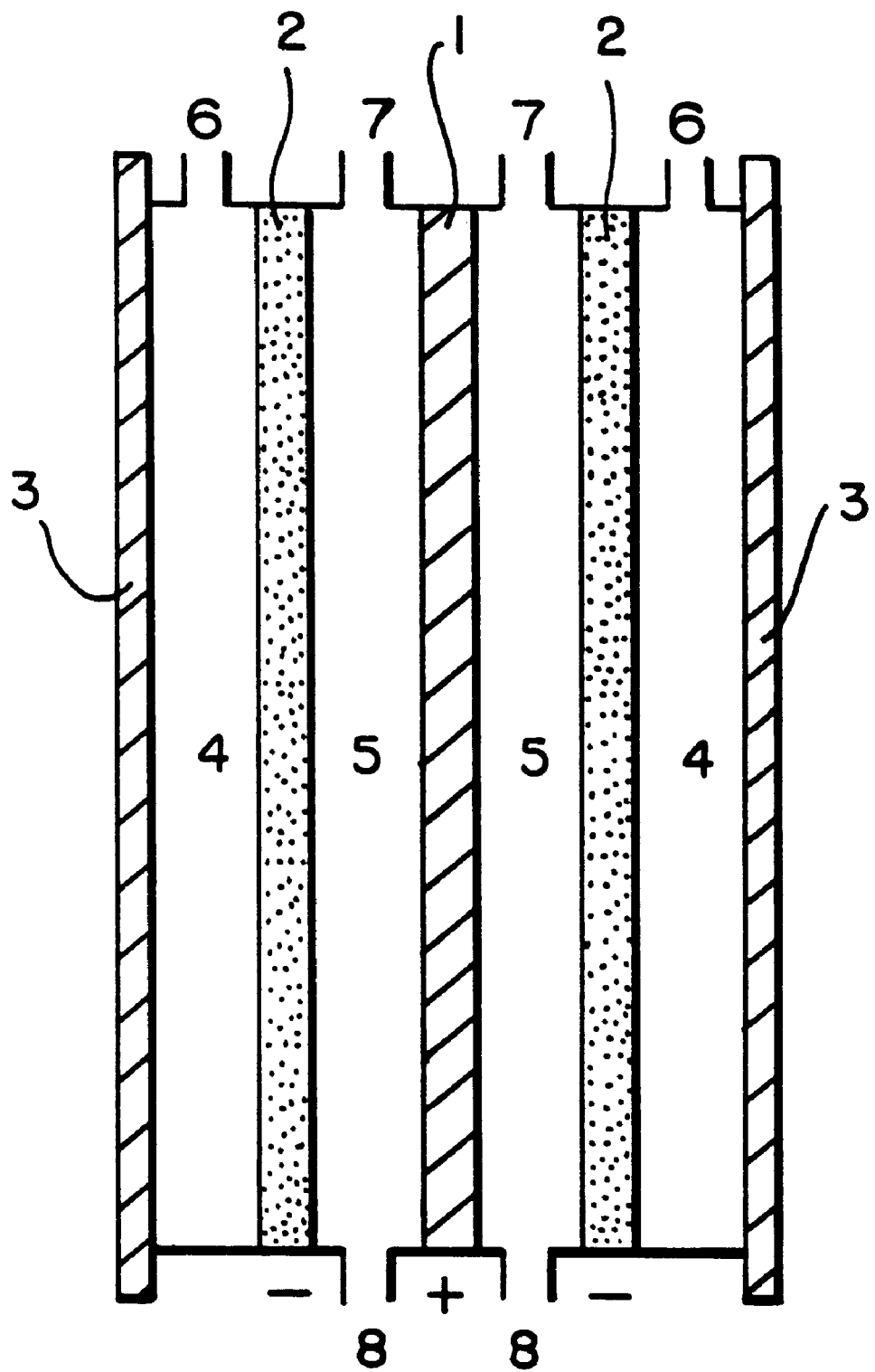

| | | |
|---|---|---|
| 2080686 | 2/1994 | (ES) . |
| 2270211 | 12/1975 | (FR) . |
| 320453 | 1/1972 | (GR) . |
| 962212 | 9/1982 | (GR) . |
| 966028 | 10/1982 | (GR) . |
| 4118091 | 4/1992 | (JP) . |
| 4197489 | 7/1992 | (JP) . |
| 7900347 | 12/1977 | (WO) . |

OTHER PUBLICATIONS

Pryolysis of Sewage Sludge and Plastics in a Fluidized Bed Reactor, Stammbach, Marc R. et al. (No date).

J. Chem Soc., Faraday Trans. L.; Oxidation of 2,4–Dibromo–6–nitroaniline in Aqueous Sulphuric Acid Solutions on a Platinum Electrode; Arias, Santiago et al. 1987, 83 (8), 2619–2633 (No month).

"Pedido Unginal", P. Cabot (2 pages) (No date).

Journal of Applied Electrochemistry; Thin–film Catalyst Layers of Polymer Electrolyte Fuel Cell Electrodes; Wilson, M.S., Gottesfeld, S. 22(1992) 1–7 (No month).

Process Technologie for Water Treatment; Treatment Techniques for Wast Water from Chemical Industries; Plattner, E., Comninellis, Ch. 1988 205–217 (No month).

Electrochemical Oxidation of 2,4–Dibromoaniline in Aqueous Sulphuric Acid Solutions, Arias, S. Brillas, E. 1985; vol. 30, No. 11, pp 1441–1448, No month.

J. Electroanal. Chem., Effect of Methyl Groups as o–Substituents on the Anodic Decomposition Pathways of Substitute p–Bromoanilines in Aqueous Sulphuric Acid Solutions at a Platinum Electrode; Arias, S., Costa, J.M. 283 (1990) 231–250 No month.

J. Electrochem. Soc., The Anodic Decomposition Pathways of Ortho– and Meta–substituted Anilines; Hand, Rodney L., Nelson, Robert F. 125 (1978) 1059–1069 No month.

J. Electroanal. Chem., Electrochemical Behavior of Mesidine in Aqueous Solutions; Desideri, P.G., et al. 63 (1975) 187–196 No month.

J. Electrochem. Soc., Bi–Functional Oxygen Electrode Using Large Surface Area $La_{1-x}Ca_xCoO_3$ for Rechargeable Metal–Air Battery; Shimizu, Youichi, et al., vol. 137, No. 11 (1990) 3430–3433 No month.

The Canadian Journal of Chemical Engineering; Anodic Oxidation of Phenol for Waste Water Treatment; De Sucre, V.S., Watkinson, A.P., vol. 59 (1981) 52–59 No month.

Journal of Applied Electrochemistry; Anodic Oxidation of Phenol for Waste Water Treatment; Comninellis, Ch., Pulgarin, C. 21 (1991) 703–708 No month.

J. Electroanal. Chem.; Mechanistic Aspects of Cathodic Oxygen Reduction, Fischer P., Heitbaum, J., (1980) 233–238 No month.

Journal of Applied Electrochemistry; Electrochemical Waste Water Treatment Using High Overvoltage Anodes. Part I: Physical and Electrochemical Properties of $SnO_2$ Anodes; Kotz, R, et al. 21 (1991) 14–20 No month.

Journal of Applied Electrochemistry; Anodic Oxidation of Aniline for Waste Water Treatment; Kirk, D.W. et al., 15 (1985) 285–292 No month.

ELECTROLYTIC PURIFICATION OF CONTAMINATED WATERS BY USING OXYGEN DIFFUSION CATHODES

This application is a continuation-in-part of U.S. patent application Ser. No. 08/535,223, filed Dec. 8, 1995 now abandoned, which is a 371 of PCT/ES95/00020 filed Feb. 15, 1995.

The present invention relates to a process and equipment for the electrolytic purification of contaminated waters using oxygen cathodes for the electrochemical oxidation of pollutants, especially in wastewaters, using an oxygen diffusion cathode, in order to degrade said pollutants into innocuous, biodegradable products and products insoluble in the effluent. It also relates to equipment for carrying out said process and to the use of the process and of the equipment.

This is an alternative process to the conventional ones, permitting integration of the oxidizing power of oxygen and species derived therefrom into an electrochemical oxidation cell and permitting the treatment of wastewaters containing especially toxic, non-biodegradable substances or substances which, as is the case of many industrial effluents, cannot be treated using other oxidation methods.

Toxic pollutants pose serious problems due both to their special environmental impact and to the difficulty of treating them by biological treatment in wastewater-sewage treatment plants. Indeed, when the levels of certain substances such as heavy metals, hydrocarbons, cyanides, phenols or anilines exceed certain limits, biological treatment plants are obliged to close their gates in order to avoid destruction of the microbial "ecosystem" which permits them to operate.

BACKGROUND OF THE INVENTION

Electrolysis is a method widely used for the elimination of organic and inorganic pollutants in industrial effluents. From the point of view of electrochemical treatment of wastewaters, the processes of cathodic recovery of heavy metals, in use in many industries, is well known, though it is not mentioned explicitly herein because it is outside the scope of this invention.

The oxidation of waste substances by means of oxygen can be carried out directly in the electrolytic cell, as described in patent FR 227021 1, which uses the oxygen given off at the anode to produce a fast "biodegradation" of the organic compounds in septic tanks, with formation of a floating foam which is then removed.

Japanese patent JP 04197489 proposes treatment of the wastewater with a gas containing oxygen at approximately pH 10 and subsequent electrolysis of the treated water.

Patent JP 51019363 describes an electrolytic oxidation process in which different sugared compounds and lignin are totally oxidized to carbon dioxide and water on an anode, preferably of lead dioxide. In Swedish patent SU 962212, the wastewater is treated with a gas containing oxygen in a layer of granulated conductive material (for example, Ti and SiC) situated between two electrodes.

Patent SU 3200453 claims 98% purification of a vat-dyeing wastewater using a lead dioxide anode. In other cases, such a patent EP 231100, SU 966028 or JP 04118091, the current applied during the electrolytic treatment polarizes the pollutants and generates small gas bubbles which cause said residues to cluster together in lumps and rise to the surface, from which they are removed. This technique is termed electrofloating.

The electrochemical destruction of toxic organic pollutants in wastewaters has caused great interest in recent years. In particular, the studies undertaken on electro-oxidation of phenols [references 11–14 of the bibliography listed on pages 5 and 6] and anilines [14–19] in aqueous medium at different pHs has shown the formation of a wide variety of products (dimers, polymers, benzoquinone, maleic acid, etc.), depending on the electrolysis operating conditions and the chosen reaction medium. In all this works, special stress has been laid on the type of anode on which the electro-chemical oxidation is carried out, reaching the conclusion that the best anodes are metals with high oxygen overtension. Platinum has undoubtedly been the anode most widely used in laboratory studies, due to its being a noble metal. Given the high price of platinum, however, alternative anodes have been sought, such as $PbO_2$ and doped $SnO_2$. A recent study [13] on the electro-oxidation of phenol has revealed that under certain conditions doped $SnO_2$ is a more effective anode than $PbO_2$, while the latter is actually better than platinum itself. Other types of electrodes, such as DSA® (Ti base), currently under full commercial development due to its great chemical inertia, are still not shown in the literature as anodes in the electro-oxidation processes of toxic pollutants such as phenols and anilines.

Rarely has account been taken of the effect of the cathode on the electro-oxidation of organic compounds, solid platinum or platinum deposited on a cheaper substratum such as titanium being used normally for this purpose.

Despite the work undertaken in the last few years on the electrochemical destruction of toxic organic pollutants in wastewaters, the bibliography contains no work in which their total elimination from the reaction medium has been achieved. In general, the use of anodes of Pt, $PbO_2$, or $SnO_2$ and a platinum cathode has achieved complete destruction of the initial organic compounds (anilines and phenols, for example [11–19]), though complete elimination of their intermediate reaction products has not been achieved.

In accordance with the bibliography [1–3], oxygen in an aqueous medium is reduced on a cathode of gold, mercury or graphite to generate hydrogen peroxide according to the electrochemical reaction:

$$O_2 + H_2O + 2e^- \rightarrow HO_2^- + HO^- \qquad (1)$$

The $HO^{2-}$ ion, conjugate base of the hydrogen peroxide, is a good oxidant and can react with intermediate products of the oxidation process of organic pollutants, boosting their complete degradation into water, carbon dioxide and other inorganic compounds of toxicity levels tolerable to microorganisms ($NH_3$, HCl, etc.). The efficiency of the hydrogen peroxide is especially marked if it is subjected to UV radiation of about 254 nm, which in addition to its disinfectant effect, can decompose photolytically the hydrogen peroxide generated in reaction 1 into hydroxyl radicals (after fluorine, the most oxidizing species known), much more reactive than the $H_2O_2$ itself [10]. Another by no means negligible way of boosting the oxidizing effect of this compound is the presence of Fe(II) as catalyst at a pH close to 3, which also produces hydroxyl radicals, according to the Fenton reaction. Silver or cobalt ions can also be used.

Although reaction 1 can be carried out on various cathodes, we have found that oxygen diffusion cathodes are the ones best suited for the present process.

Reaction 1 is faster and can be controlled better on oxygen diffusion electrodes than on a simple graphite electrode. Oxygen diffusion electrodes may be made of a mixture of carbon (very fine particle lampblack) and a water-repelling polymeric agglomerant (preferably polytetrafluoroethylene, PTFE), pressed at about 350–400° C. (pasty melting temperature of PTFE) on a metallic mesh generally of Ni, Ag or stainless steel) which acts as a current distributor [3–5]. The mission of the PTFE is to keep the carbon compact, with sufficient porosity to diffuse the oxygen gas and lend the whole a water-repellant character. Carbon-PTFE electrodes have been developed as components of fuel cells and some have been marketed as components of metal-air cells. Various patents have been filed over the last fifteen years describing different carbon-PTFE electrodes [2–4, 7] with applications as diverse as acting as cathodes in zinc-air cells [4–7] or being used as cathodes in electrolytic cells for the generation of base solutions of hydrogen peroxide [2,3].

Carbon-PTFE cathodes in alkaline medium are sensitive to the partial pressure of oxygen of the gas acting upon it, it having been found that the reaction speed (1) increases as the partial pressure of oxygen increases [8,9], so that circulation through them of current densities of up to 2 A/cm² can be achieved when operating with oxygen pressures of up to 5 atmospheres.

U.S. Pat. No. 4,619,745, to Porta et al. describes a process for the electrochemical decontamination of polluted water that uses a cell containing a porous cathode, in the presence of oxygen. In this process, oxygen is generated in the anode through water electrolysis according to the reaction:

$$2H_2O \rightarrow O_2 + 4H^+ + 4e^-.$$

The oxygen and oxygen dissolved in the polluted water is adsorbed on the carbon of the cathode and finally it is reduced, by applying a voltage, to obtain $HO_2^-$.

The cathode is a structurally porous carbon or graphite cathode, freely permeable to water, which provides a bed of adsorbent particles. The water with dissolved oxygen runs through the mass of the cathode, where the oxygen is reduced according to the reaction:

$$O_2 + H_2O + 2e^- \rightarrow HO_2^- + OH^-.$$

The oxidizing species $HO_2^-$, which is very active but unstable, is used as depolluting agent; $HO_2^-$ is decomposed to form active (nascent) oxygen, and the impurities present in the water are substantially treated by the presence of this active (nascent) oxygen.

When the degree of pollution is very high, an additional inlet is used, through which oxygen from an external source is bubbled or supplied into the cathode through which the water is flowing. This is additional oxygen that enters the cell with the same purpose as that added to the water before entering the apparatus.

The process of U.S. Pat. No. 4,619,745 has the following drawbacks:

First, the oxygen that dissolves in the water, or in the form of bubbles, imposes a limitation, since the current densities that can be used are limited by the solubility of oxygen in water. As a result, the oxygen contents reacting in the cathode is low, and the reaction products do not have a fast oxidizing effect on the pollutants due to their low concentration. Additionally, the oxygen bubbles within the cathode mass reduce the conductivity.

The cathode acts as a filter, with all the water flowing therethrough, so that impurities from water remain retained inside the carbon or graphite thereof, so that after a period of operation the process must be stopped and the cathode has to be cleaned from impurities.

Bibliography

1. P. Fischer and J. Heitbau, J. Electroanal. Chem., 112, 231 (1980).

2. A. C. C. Tseung and S. M. Jasem, U.S. Pat. No. 4,300,987, 30 Nov. 17, 1981.

3. I. Mathur, A. James and D. Bissett, European Patent No. 0248433 A2, Dec. 9, 1987; U.S. Pat. No. 4,927,509, May 22, 1990.

4. W. H. Hoge, U.S. Pat. No. 4,885,217, Dec. 5, 1989.

5. Y. Shimizu, K. Uemua, H. Matsuda, N. Miura and N. Yamazoe, J. Electrochem. Soc., 137, 3430 (1990).

6. A. Ohta, V. Morita, N. Koshiba and K. Momose, Proceedings of the Second Battery Material Symposium, 441 (1985).

7. J. McEvoy, U.S. Pat. No. 4,585,710, Apr. 29, 1986.

8. R. Manoharan, D. D. Sarma and A. K. Shukla, J. Power Sourc., 13, 273 (1984).

9. M. S. Wilson and S. Gottesfeld, J. Applied Electrochem., 22, 1 (1992).

10. W. R. Haag and C. C. D. Yao, Envir. Sci. Technol., 26, 1005 (1992).

11. V. Smith de Sucre and A. P. Watkinson, Can. J. Chem. Eng., 59, 52 (1981).

12. R. Kotz, S. Stucki and B. Carcer, J. Applied Electrochem., 21, 14 (1991).

13. C. Comninellis and C. Pulgarin, J. Applied Electrochem., 21, 703 (1991).

14. C. Comninellis and E. Plattner, Chimia, 42, 250 (1988).

15. P. G. Desideri, L. Lepri and D. Heimler, J. Electroanal. Chem., 63, 187 (1975).

16. R. L. Hand and R. F. Nelson, J. Electrochem. Soc., 125, 1059 (1978).

17. S. Arias and E. Brillas, Electrochim. Acta, 30, 1441 (1985); J. Chem. Soc., Faraday Trans. 1, 83, 2619 (1987).

18. D. W. Kirk, H. Sharifan and F. R. Foulkes, J. Applied Electrochem., 15, 285 (1985).

19. S. Arias, E. Brillas and J. M. Costa, J. Electrolanal. Chem., 283, 231 (1990).

DETAILED DESCRIPTION OF THE INVENTION

Despite the extensive bibliography which exists on aspects related to the process described, no publication is known to date which considers the method of electrolytic degradation described herein. The technique to be applied is therefore novel, and consists in a double method of electrochemical destruction of organic pollutants, since the oxidation takes place both in the anode when said substances give up their electrons to it directly, or by reaction with oxidizing species generated there, such as hydrogen peroxide, peroxhydril ($HO_2^{\cdot}$), hydroxyl radicals (radical $OH^{\cdot}$) and $O_3$ and mixtures thereof, and near the oxygen diffusion cathode, capable of generating hydrogen peroxide as an oxidizing species active on the reaction intermediates, that in turn is able to produce a still more active species, the hydroxyl radical, in the presence of UV radiation and/or catalytic Fe(II) at acid pH. This is thus an active cathode supplied with oxygen or a mixture of gases containing it, such as air.

A separation membrane may or may not be fitted between anodes and cathodes. In the cell it is advantageous to promote turbulence of the effluent. Possibly, it should be provided with a heat exchanger to bring the effluent to optimum working temperature. The oxygen cathodes are in contact with the solution, on the one hand, and with oxygen or a gas containing oxygen, on the other. A direct current of voltage lower than 100V, preferably between 1 and 10 volts, is applied between anode and cathode.

The potential applied to the cathode must be such that reduction of the water itself with release of $H_2$ is avoided:

$$2H_2O + 2e^- \rightarrow 2OH^- + H_2 \qquad (2)$$

Through these cathodes oxygen from the air or pure oxygen at atmospheric pressure is diffused, although the pressure of the gas impinging on the cathode can also be increased (preferably up to about 5 atm) in order to increase the current density and the efficiency of the process (in this case it is all kept in the pressurized system).

It is noteworthy that the oxygen does not necessarily percolate through the cathode, that is, no oxygen bubbles are formed at the electrode-electrolyte interfaces, which demonstrates that all the oxygen is converted into $HO_2^-$ in the Faraday process. The bubbling of gas in solution is therefore unnecessary.

Where air is used as the oxygen gas carrier it is advisable to work with a high flow thereof so that the partial pressure of the oxygen does not fall during the process, which requires a compressor.

Amongst the many metals and alloys which can be used as anodes we might mention Fe and Al, though these are sacrificial electrodes which have to be changed at intervals. Ni and Ag anodes are relatively stable in a base medium. Amongst the metallic oxides are various stable anodes of high oxygen overvoltage, such as anodes coated with $PbO_2$ (doped or undoped) or doped $SnO_2$, or else ones with low oxygen overvoltage yet chemically inert, such as DSA® (Ti base) electrodes. In the presence of iron salts and in acid medium (Fenton-type conditions) these oxides can also be used, although the preferred anode is of platinum or Ti coated with a fine layer of platinum. The anodes can have any shape: sheets, wire, three-dimensional foams, metal meshes or fabrics, etc.

Work can be carried out in the entire range of temperatures in which the water is liquid (over 100° C. in pressurized systems), although economic considerations make it advisable to work at moderate temperatures (up to a maximum of about 80° C.) in non-pressurized systems.

It is preferable that the waters to be treated circulate in turbulent regime, either by conventional agitation or by forced circulation through turbulence promoters, in order to favor transportation of the electroactive species to the electrodes.

Of the many possible electrolytes, the following are worthy of mention: hydroxides, for example of lithium, sodium, potassium or calcium (precipitable as calcium carbonate following the treatment), which have the advantage of giving rise to high conductivity levels which are sufficient at relatively low concentrations, or sodium or potassium carbonates whose addition to wastewaters containing heavy metal cations leads to the precipitation thereof, so that no metals other than alkalines can remain in the water in soluble form. Carbonate ions nevertheless have the disadvantage of reacting with the hydroxyl radical ($OH^-$), a highly oxidizing species likely to be generated in the process (especially when irradiation with UV light is performed) and one which should preferably be used to attack the pollutants to be eliminated. Another applicable anion, especially in acid medium, is sulphate. This has the advantage that it can be precipitated as calcium sulphate in a subsequent neutralization of waters treated with lime. Concentrations of added electrolyte should be low, between 0 and 1 moles per litre (M), preferably between 0 and 0.1 M, while in many cases the conductivity of the effluent will make the addition of an electrolyte unnecessary, all the more so if it is previously adjusted using a physico-chemical treatment, with the consequent addition of flocculating agents, coagulants, polyelectrolyte and pH adjusting substances. This treatment is often necessary, for the water entering the process should not contain large quantities of matter in suspension and its pH should be set in advance.

A water treatment process is presented which can be alternative or complementary OT the conventional biological treatment used today in many sewage/wastewater treatment plants (STP). This is because the biological process suffers from a number of defects. The biological purification plant is essentially a culture of microorganisms, especially bacteria, which feed on pollutants, oxidizing them. It is therefore an ecosystem and, like any ecosystem, it is not easy to maintain in a stationary state. Indeed, population fluctuations take place which make the purification plant more or less efficient in function of many environmental parameters, such as temperature, but mainly in function of the quantity and types of pollutants contained in the input water. In order to limit the variations of these parameters and their repercussions on the microorganism population, large homogenizing tanks are used at the initial stage of the STPs, this problem is especially delicate in the case of industrial wastes. Often, and most particularly in fine chemical industries, the composition of the effluents changes completely in a matter of minutes and, in the case of STPs shared by several industries, the quantity and variety of pollutants is such that the microorganisms can rarely cope with them. Such media are so toxic that even the most resistant strains die in the end. For all these reasons, a biological STP is considered to be satisfactory when it manages to eliminate a temporal average of 70% of the pollutant charge which it receives. This result is not all that poor, but technologies which comfortably exceed these standards are required. Furthermore, for the reasons outlined above, the start-up of a biological treatment plant is neither simple nor fast. The condition of the water must be monitored and a period which may last weeks must be waited in order to reach sufficiently large and stable microbial populations for the plant to work at full output. Another problem associated with biological STPs lies in the unpleasant odors they produce due to pollutants and volatile degradation products; quite possibly the most serious of the associated disadvantages, however, is the by-production of a considerable quantity of sludges. Indeed, the mission of a conventional STP is basically to separate out the pollutants from the water, not to destroy them. This separation gives rise to by-products (sludges) in substantially higher quantities than the quantities of pollutants eliminated from the fluid, and the destruction of such sludges is frequently poorly handled.

The process of the invention aims to resolve or at least alleviate these problems. In particular, this electrochemical process can operate without need for the long start-up time of a conventional STP, and it is not influenced by the pernicious toxic effects which pollutants exercise upon bacteria and other living organisms.

There is nevertheless one special advantage which should be stressed. This technology is cleaner than the conventional one, since the objective which it pursues is destruction of the pollutants, rather than the mere separation thereof from the aqueous effluent. It is further based on a relatively clean form of energy, electricity. The process can be carried out at room temperature and it does not require particularly toxic or expensive chemical products. In this sense it represents a major saving of resources.

Electrochemical treatment thus emerges as a secondary treatment alternative to biological treatment in the case of pollutants that the toxic for microorganism cultures or wastes which are particularly difficult to treat using conventional treatments. The preferred profile for this invention does not imply, however, that primary treatment is always necessary in real cases, or that in other cases the electrochemical treatment cannot be followed by biological treatment. Probably, in certain cases the most practical use would be in combination with a biological treatment. The electrochemical treatment would in such cases degradate the pollutants into smaller and more oxidized molecules which can be assimilated by the microorganisms of the secondary treatment. On other occasions this electrolytic process can serve as a tertiary or fine-cleansing treatment for water already treated in a conventional way.

This dual oxidizing method, the anodic one and that induced by the hydrogen peroxide cathodically electrogenerated, gives rise to a notable increase in the speed of degradation of the pollutants and, therefore, a reduction of the time needed for their complete destruction, which is bound to lead to lower costs.

This process permits a notable increase in the efficiency of degradation, achieving if so wished a complete mineralization of the organic pollutants. Said mineralization is necessary for effective purification of aqueous industrial effluents, especially those containing toxic substances, and thereby permits reutilization of the treated water. These characteristics make it particularly applicable to the decoloration and deodorization of wastewaters. One case in which the this process would be particularly applicable would in this sense be the bleaching of paper pulp and the treatment of paper industry wastewaters.

This electrolytic process of pollutant destruction permits operation preferably at low electrolyte concentrations (up to 0.1 M). Much of the work defined as environmental suffers from the use of high concentrations of supporting elecrolytes, which makes them unviable in practice both from the economic and ecological points of view (it is of little use to decontaminate an effluent of, for example, phenol, if in the end it is discharged into a river with large quantities of dissolved salts).

Unlike other electrolytic decontamination processes, the present method works without difficulty in the presence of chlorides, thus avoiding the usual problems of corrosion and completely degradating the initial chlorinated compounds or those which may be generated during the process.

It should be understood that any oxidation process which involves species generated electrochemically by oxygen reduction lies within the scope of this invention, even if said oxidation takes place in a reactor separate from the electrolytic cell. Likewise, despite the fact that this description centres on the treatment of wastewaters, it will be clear to the skilled man that the same principle and type of apparatus can be used for the purification of other solvents or mixtures thereof, and in the oxidation of dissolved substances for purposes other than purification. One example of a non-purification application could be the above-mentioned bleaching of paper pulp.

The preferred application nonetheless contemplates small and medium-scale electrochemical treatment plants, in principle one for each industry or group of related industries. Their cost and maintenance would be moderate and such plants could operate continuously, 24 hours a day. Stoppages and start-up of such plants would involve little more than closing or opening a valve and a switch.

MODES OF EMBODIMENT OF THE INVENTION AND DESCRIPTION OF A PREFERRED EMBODIMENT

FIG. 1 attached to this specification, and constituting the only figure, shows schematically the equipment used to carry out the electrolytic treatment process of this invention.

The equipment necessary to carry out the process comprises an electrolytic cell equipped in batch or continuously with one or several anodes, such as those described above, and one or several oxygen diffusion cathodes. By way of example of the design, FIG. 1 presents a schema for continuous functioning, which is nevertheless not restrictive on the equipment since, for example, several of the modules of FIG. 1 could be coupled together in order to increase thereby the number of electrodes and the efficiency of the process. The anode 1 and the cathodes 2 will be laid out preferably in vertical position, parallel and close to each other in order to minimize the electrical resistance of the solution. The cell is sealed on both sides with two frames 3. Said electrodes and frames leave four compartments between them. Between frames and cathodes the compartments 4 are supplied with oxygen gas through the inlets 6, while through the compartments 5 situated between cathodes and anode circulates the wastewater to be treated circulates, which enters through the inlets 7 and emerges through the outlets 8.

List of References
1: Anode
2: Cathodes
3: Frames
4: Compartments through which oxygen gas or gas containing oxygen circulates
5: Compartments through which the wastewater circulates
6: Inlet for oxygen or gas containing oxygen
7: Wastewater inlets
8: Wastewater outlets The present invention is illustrated additionally by means of the following examples, which do not restrict its scope:

EXAMPLE 1

(1a) Water contaminated with 100 ppm of aniline in NaOH 0.05M (pH 12.7) was electrolyzed at a constant current of 0.3 Amps between an oxygen diffusion cathode (3.1 cm$^2$) and an anodized Pb anode (7 cm$^2$) at 25° C. The cathode was supplied with pure oxygen at atmospheric pressure. The concentration of aniline decreased exponentially, with an average lifespan of 24 minutes, reaching undetectable levels by the end of the experiment. The initially colorless solution turned intensely colored (brown) after a few minutes. After the first hour of electrolysis the color gradually lightened until after 6 hours the fluid was practically colorless.

The final oxygen chemical demand (OCD) was 51 mg/l, compared with the 248 mg/l found for the initial solution.

(1b) In an electrolysis the same as the above, but with an anode of 10 cm$^2$ and the process run for 11 hours, the total organic carbon (TOC) content fell from 79 to 2 ppm.

EXAMPLE 2

An experiment identical to that of example 1, but using sodium carbonate 0.1 M (pH 11.8) as an electrolyte, revealed the same average lifespan for the aniline, but after 6 hours of electrolysis the final OCD turned out to be 84 mg/l, showing thereby that the intermediates are more difficult to degrade in the presence of carbonate ion than in the absence of same.

EXAMPLE 3

(3a) Water contaminated with 100 ppm of 4-chloroaniline was electrolyzed under the same conditions as example 1a. The average lifespan for this chlorinated derivative turned out to be 23 minutes. As in the previous examples, the solution took on color at first and then gradually decolored.

After 5 hours of electrolysis the solution was practically colorless and the OCD was below the standard detection limits.

(3b) Under an electrolysis the same as the previous one, but with an anode of 10 cm$^2$ and prolonged for 9 hours, the total organic carbon (TOC) content fell to 4 ppm.

EXAMPLE 4

Water contaminated with 100 ppm of 4-chloroaniline was electrolyzed under the same conditions as example 3a, but in this case under the direct irradiation of a UV lamp centred on 254 nm. In this case the final degradation was notably quicker, given that the average lifespan was reduced to 9.4 minutes. After 3 hours the solution was colorless and the OCD undetectable.

EXAMPLE 5

(5a) Water contaminated with 100 ppm of aniline in NaOH 0.05M (pH 12.7) was electrolyzed at a constant current of 0.3 Amps between an oxygen diffusion cathode (3.1 cm$^2$) and a Ti/Pt/PbO$_2$ anode (13 cm$^2$) at 25° C. The cathode was supplied with pure oxygen at atmospheric pressure. After 7 hours, and with the solution completely colorless, at TOC content of 19.8 ppm was found.

(5b) In an identical experiment, but in the presence of 500 ppm of added chlorine ion, a TOC of 21.4 ppm was found after 7 hours, a figure very similar to that of the previous example. No signs of corrosion were observed on the electrodes and, what is more, the potential applied during the experiment (variable in order to keep the 0.3 Amp current constant) was significantly lower than for example 5a, given the greater conductivity of the solution.

EXAMPLE 6

A number of experiments illustrate the advantage of using Fenton-type conditions for the present invention. Table 1 shows the TOC reduction obtained after 7 hours of electrolysis by passing a current of 0.3 A through a solution containing 100 ppm of aniline at initial pH ranges between 2.9 and 3.8.

In an experiment at pH=3.5 with an electrolyte of H$_2$SO$_4$ with FeSO$_4$ 1 mM, after 7 hours of electrolysis at 25° C. the TOC had reduced by 63.2 per cent. When a flow of oxygen of 60 ml min$^{-1}$ was passed through the solution under the same conditions the TOC fell by 84.1 per cent.

The cell worked at lower voltage when Na$_2$SO$_4$ was added. In all cases it was observed that the cell voltage remained between 10 V and 12 V throughout the 7 hours of electrolysis at 25° C., while that value remained between 8 V and 10 V at 40.1° C. In these experiments a flow of oxygen of 60 ml min$^{-1}$ or a flow of air of 714 ml min$^{-1}$ was passed through the solution. The absence of Fe(II) led to a small TOC reduction, of only 49.5 per cent, while the presence of a small quantity of Fe(II), 1 mM, provided TOC decreases of 86.9 per cent with air flow of 25° C. and 96.6 per cent in the presence of oxygen flow, UV light and at 40.1° C.

From the results of Table I it can be concluded that:

A. To obtain good TOC decreases an Fe(II) salt is required and oxygen or air must be passed through the solution. Such conditions favor the decomposition of the hydrogen peroxide into hydroxyl radicals (Fenton reaction) which oxidize the initial products and the various intermediate products of the process. This process is boosted by the presence of dissolved oxygen gas, which can react with intermediate organic radicals to generate easily degradable peroxo-derived radicals. All the organic species appear to be oxidizable anodically and/or by the Fenton process. We call this synergic effect "Electro-Fenton".

B. The use of UV light centered on (366 nm, 30 W) and an increase of temperature provide a further boost to the Electro-Fenton process of degradation of the aniline and its oxidation intermediates, which is in accordance with a greater generation of hydroxyl radicals in the medium or the basis of the hydrogen peroxide electrogenerated on the carbon-PTFE cathode (a process we call "Photoelectro-Fenton").

TABLE 1

Results obtained by electrolyzing 100 ml of a solution of 100 ppm of aniline in a sulphuric acid medium with a Ti/Pt/PbO$_2$ anode and a carbon-PTFE cathode supplied with a flow of oxygen of 60 ml min$^{-1}$. In all cases a current intensity of 0.3 A was passed for 7 hours.

| MEDIUM | pH TOC/° C. | Temp. | TOC Fall | OBSERVATIONS |
|---|---|---|---|---|
| H$_2$SO$_4$ + FeSO$_4$ 1 mM | 3.5 | 25.0 | | 63.2% without O$_2$ through the solution |
| H$_2$SO$_4$ + FeSO$_4$ 1 mM | 3.5 | 25.0 | | 84.1% + O$_2$ through the solution |
| H$_2$SO$_4$ + FeSO$_4$ 0.05 M | 3.0 | 25.0 | | 49.5% + O$_2$ through the solution |
| H$_2$SO$_4$ + FeSO$_4$ 0.05M + FeSO$_4$ 1 mM | 3.8 | 25.0 | | 91.7% + O$_2$ through the solution |
| H$_2$SO$_4$ + FeSO$_4$ 0.05M + FeSO$_4$ 1 mM | 3.1 | 25.0 | | 86.9% + Air through the solution |
| H$_2$SO$_4$ + FeSO$_4$ 0.05M + FeSO$_4$ 1 mM | 2.9 | 25.0 | | 89.4% + O$_2$ through the solution |
| H$_2$SO$_4$ + FeSO$_4$ 0.05M + FeSO$_4$ 1 mM | 3.0 | 25.0 | | 94.4% + O$_2$ through the solution + UV (366 nm) |
| H$_2$SO$_4$ + FeSO$_4$ 0.05M + FeSO$_4$ 1 mM | 3.0 | 40.1 | | 96.6% + O$_2$ through the solution + UV (366 nm) |

EXAMPLE 7

This example shows the scale up of the Electro-Fenton process to an experimental pilot plant. 25 liters of water contaminated with 100 ppm of aniline, 0.05 M of Na$_2$SO$_4$, 1 mM of iron sulphate and sulphuric acid (up to initial pH 2.7) were electrolyzed between a Ti anode coated with Pt (100 cm$^2$) and a cathode of commercial carbon-PTFE (100 cm$^2$) using a recirculation device (flow 300 l/h) for 9 hours at a current density of about 400 A/m$^2$ and at an initial temperature of 35° C. The final solution had a pH of 2.43 and a temperature of 41.6° C. The percentage reduction of the TOC was 60 per cent.

What is claimed is:

1. An electrolytic cell apparatus for treatment of wastewater comprising pollutants, said electrolytic cell comprising:

at least two frames;
   at least one anode;
   at least one oxygen diffusion cathode which is impermeable to water;
   at least one first compartment delimited between at least one of said frames and said at least one cathode, said at least one first compartment, having a first inlet;
   a source of oxygen which causes oxygen or a mixture of gases containing oxygen to be added to said electrolytic cell through said first inlet;
   at least one second compartment delimited between said at least one anode and said at least one cathode, said at least one second compartment having a second inlet; and a source of wastewater which causes said wastewater to be added to said electrolytic cell through said second inlet.

2. The apparatus of claim 1, wherein said at least one second compartment further comprises an outlet, and said wastewater added to the electrolytic cell flows from said second inlet to said outlet.

3. The apparatus of claim 1, wherein said at least one cathode comprises carbon and a water-repellant polymer or polymeric agglomerant.

4. The apparatus of claim 3, wherein said water-repellant polymer is polytetraflouroethylene.

5. The apparatus of claim 3, wherein said oxygen diffusion cathode further comprises a metallic mesh structure.

6. The apparatus of claim 5, wherein said metallic mesh structure comprises a metal selected from the group consisting of nickel, silver, or stainless steel.

7. The apparatus of claim 1, wherein said at least one anode comprises a metal or metal oxide.

8. The apparatus of claim 7, wherein said metal or metal oxide is selected from the group consisting of lead dioxide, tin dioxide, platinum, titanium or mixtures thereof.

9. The apparatus of claim 7, wherein said anode further comprises doping or catalyzing species.

10. The apparatus of claim 9, wherein said doping species are selected from the group consisting of antimony and bismuth.

11. The apparatus of claim 1, wherein the cathodes and anodes are disposed in a vertical position and parallel to each other.

12. The apparatus claim 1, wherein oxidation of said pollutants occurs at said at least one anode and near said at least one cathode.

13. The apparatus of claim 1, wherein said at least one anode is a chemically inert, high oxygen overvoltage anode.

14. A process for the treatment of wastewater comprising pollutants in an electrolytic cell comprising at least one anode and at least one cathode, said process comprising:

contacting said wastewater comprising pollutants with said at least one anode and said at least one cathode, said at least one cathode being an oxygen diffusion cathode which is impermeable to water;

supplying oxygen gas or a gaseous mixture containing oxygen to said at least one cathode;

forming oxidizing species at said at least one anode and near said at least one cathode, said oxidizing species being selected from the group consisting of hydrogen peroxide, peroxhydril and hydroxyl radicals and mixtures thereof; and oxidizing said pollutants at said at least one anode and near said at least one cathode.

15. A process as claimed in claim 14, said process further comprising circulating said wastewater through said electrolytic cell under turbulent conditions.

16. A process as claimed in claim 14, said process further comprising contacting said wastewater with an electrolyte selected from the group consisting of an acid, alkali, salt or hydroxide.

17. A process as claimed in claim 14, said process further comprising irradiating said wastewater with ultraviolet or visible light.

18. A process as claimed in claim 14, said process further comprising contacting said wastewater with a redox catalyst selected from the group consisting of iron, silver, or cobalt ions.

19. A process as claimed in claim 14, wherein no oxygen bubbles are formed at said at least one cathode.

* * * * *